(12) United States Patent
Vedanabhatla et al.

(10) Patent No.: US 8,339,955 B2
(45) Date of Patent: Dec. 25, 2012

(54) OUT-OF-BAND CONTROL OF COMMUNICATION PROTOCOL IN AN IN-LINE DEVICE

(75) Inventors: Kiranmai Vedanabhatla, San Jose, CA (US); Geoffrey T. Hibbert, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 694 days.

(21) Appl. No.: 11/675,038

(22) Filed: Feb. 14, 2007

(65) Prior Publication Data
US 2007/0189172 A1 Aug. 16, 2007

Related U.S. Application Data

(60) Provisional application No. 60/773,558, filed on Feb. 14, 2006.

(51) Int. Cl.
*H04L 1/00* (2006.01)
(52) U.S. Cl. .......................... 370/232; 370/239; 370/241
(58) Field of Classification Search .................. 370/216, 370/239, 241, 232; 710/105
See application file for complete search history.

(56) References Cited

U.S. PATENT DOCUMENTS

| | | | | |
|---|---|---|---|---|
| 5,970,022 A | * | 10/1999 | Hoang | 365/233.5 |
| 7,500,047 B1 | * | 3/2009 | Tyndall et al. | 710/315 |
| 2003/0053170 A1 | * | 3/2003 | Levinson et al. | 359/152 |
| 2003/0055915 A1 | * | 3/2003 | Ngo | 709/219 |
| 2003/0147419 A1 | * | 8/2003 | Vimpari et al. | 370/466 |
| 2005/0138258 A1 | * | 6/2005 | Seto | 710/301 |
| 2006/0129733 A1 | * | 6/2006 | Sobelman | 710/305 |
| 2007/0096837 A1 | * | 5/2007 | Liu et al. | 331/74 |

* cited by examiner

*Primary Examiner* — Huy D Vu
*Assistant Examiner* — Omer Mian
(74) *Attorney, Agent, or Firm* — Matthew A. Pequignot; Pequignot + Myers LLC (57) ABSTRACT

Systems and methods for a network diagnostic component that is placed in-line between two nodes in a network to control the protocol with which two nodes communicate. The network diagnostic component receives a network data stream from a first node for communication with a second node. The network data stream is received by a receive component or module. The network data stream includes a portion that conforms with at least a first network protocol. The diagnostic component then determines that the first network protocol is not to be used to communicate with the second node. This determination is performed by a determine component or module. The diagnostic component modifies the network data stream so that the network data stream is in a form that is no longer recognized by the second node as being in accordance with the first network protocol. The modification is performed by a modification component or module.

16 Claims, 4 Drawing Sheets

OUT-OF-BAND CONTROL OF COMMUNICATION PROTOCOL IN AN IN-LINE DEVICE

CROSS-REFERENCE TO RELATED APPLICATIONS

This application claims the benefit of U.S. Provisional Application No. 60/773,558, filed Feb. 14, 2006, which is incorporated herein by reference in its entirety.

BACKGROUND

Computer and data communications networks continue to proliferate due to declining costs, increasing performance of computer and networking equipment, and increasing demand for communication bandwidth. Communications networks—including wide area networks ("WANs"), local area networks ("LANs"), metropolitan area networks ("MANs"), and storage area networks ("SANS")—allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET"), Serial Attached SCSI ("SAS"), Serial Advanced Technology Attachment ("SATA"), and Infini-Band networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind much of the advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one Gigabit per second. This rate has increased to the point where data can travel across various networks such as Ethernet and SONET at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

BRIEF SUMMARY

Embodiments disclosed herein relate to a network diagnostic component that is placed in-line between two nodes in a network to control the protocol with which the two nodes communicate. For example, the network diagnostic component receives a network data stream from a first node for communication with a second node. The network data stream may be received by a receive component or module. The network data stream includes a portion that conforms with at least a first network protocol.

The diagnostic component then determines that the first network protocol is not to be used to communicate with the second node. This determination may be performed by a determine component or module.

The diagnostic component modifies the network data stream so that the network data stream is in a form that is no longer recognized by the second node as being in accordance with the first network protocol. The modification may be performed by a modification component or module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows, and in part will be obvious from the description, or may be learned by the practice of the embodiments disclosed herein. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The embodiments disclosed herein relate to a network diagnostic component or device that is placed in-line between a first and second node. The diagnostic component or device is used to control a protocol with which the first and second nodes communicate with each other. For example, the first node may communicate with the second node using a network data stream that includes portions that conform to a first network protocol. In some embodiments, the first network protocol may be the SAS or SATA protocol. The network diagnostic component may receive the network data stream and determine that the first network protocol is not to be used for communication between the nodes. The network diagnostic component may then modify the network data stream so that it is in a form that the second node does not recognize.

The embodiments disclosed herein may be practiced in networking systems, including the testing of high speed data transmission systems and components. Embodiments described herein may also be used in other contexts unrelated to testing systems and components and/or unrelated to high speed data transmission. An example networking system will first be described. Then, the operation in accordance with specific embodiments disclosed herein will be described.

Example Networking System

Figure 1:
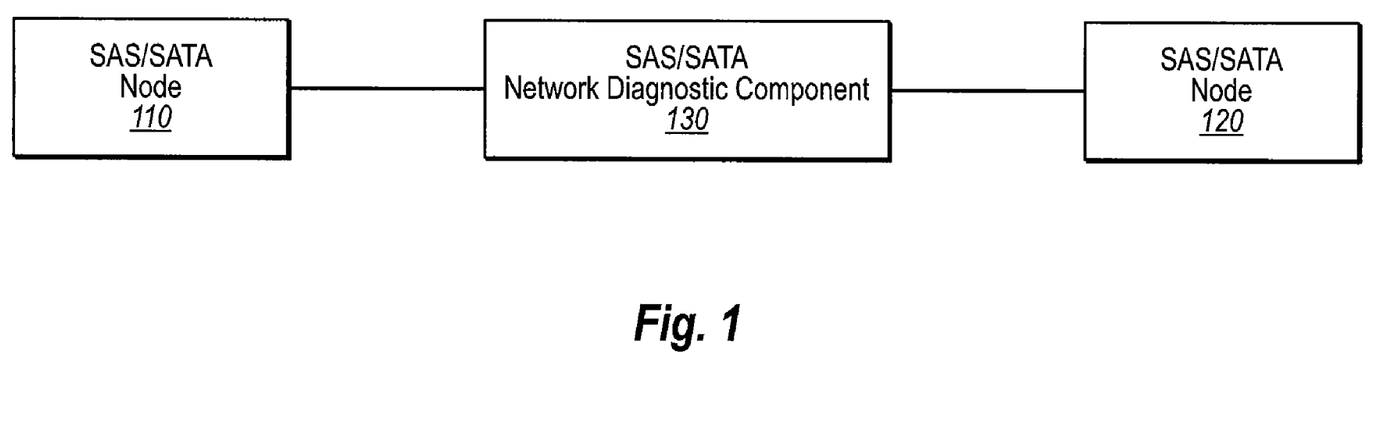
FIG. 1 illustrates a block diagram of a network including a network diagnostic component placed in-line between two nodes.

FIG. 1 is a block diagram of a networking system 100. The networking system 100 may include one or more nodes 110, 120, which communicate with each other via a network. As used herein, a "node" includes, but is not limited to, a server or host; a client or storage device; a switch; a hub; a router; all or a portion of a SAN fabric; a diagnostic device; and any other device or system, or combination thereof, that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" or "network data stream" includes, but is not limited to, a packet; a datagram; a frame; a data frame; a command frame; an ordered set; any unit of data capable of being routed (or otherwise transmitted) through a computer network; and the like. In one embodiment, a network message or data stream may comprise transmission characters used for data purposes, protocol management purposes, code violation errors, and the like.

Also, an ordered set may include, a Start of Frame ("SOF"), an End of Frame ("EOF"), an Idle, a Receiver_Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), Serial SCSI Architecture ("SSA"), and the like. In this description and in the claims, protocol is defined to mean at least the speed at which the nodes communicate and the communication rules that are used by the nodes when communicating.

As shown in FIG. 1, the nodes 110,120 are preferably SAS/SATA nodes. As used herein, "SAS/SATA nodes" includes nodes that are SAS compatible, nodes that are SATA compatible, and nodes that are both SAS compatible and SATA compatible. It will be appreciated, however, that the nodes 110,120 need not be SATA/SATA nodes and that the nodes 110,120 may be other types of nodes that are compatible with other types of network protocols. In addition, any reference to a node as being a host or initiator node and another node as being a target node is for illustration only. It is contemplated that nodes 110, 120 can be both host and target nodes as circumstances warrant.

The networking system 100 may comprise a network, network diagnostic system, a network testing system, or the like including network diagnostic components (such as network diagnostic component 130), which may be configured to communicate network messages among nodes. For example, the network diagnostic component 130 may be inserted between the nodes 110,120 such that network messages sent between the nodes 110,120 are available to network diagnostic component 130 and/or are routed through the network diagnostic component 130.

In further detail, the network diagnostic component 130 may send and receive signals or data. Accordingly, using a signal, the network diagnostic component 130 may receive one or more network messages from a node, send one or more network messages to a node, or both. For example, the network diagnostic component 130 may receive one or more network messages sent between the nodes 110,120. The network diagnostic component 130 may also retransmit those network messages. In particular, the network diagnostic component 130 may receive network messages sent from the node 110 and then retransmit them to the node 120. Also, the network diagnostic component 130 may receive network messages sent from the node 120 and then retransmit them to the node 110. As used herein, "in-line" denotes that a network diagnostic component is configured to have the network messages sent between two nodes routed to it so that the network messages are available to the network diagnostic component. In some embodiments the network diagnostic component may be directly in-line or it may be indirectly in-line through the use of a tap or like device. In still other embodiments, the network diagnostic component may have the network messages routed to it in any reasonable way.

Prior to retransmitting these network messages, the network diagnostic component 130 can modify the signal used to transmit the network messages. For example, the network diagnostic component 130 may digitally retime the signal, may modify the content of the messages themselves, or both. It will be appreciated that the network diagnostic component 130 may modify the signal in other desired ways. Because it is not always desirable to have the network diagnostic component 130 modify the signal, the network diagnostic component 130 may be selectively configured to modify (or not to modify) the signal used to transmit the network messages.

The network diagnostic component 130 may also perform a variety of network diagnostic functions using network messages sent between the nodes 110,120. In performing some of these diagnostic functions, the network diagnostic component 130 may be configured to be passive to the network messages. If desired, the network diagnostic component 130 may receive at least some of the network messages, and may transmit some or all of the received traffic. In performing other diagnostic functions, the network diagnostic component 130 may be configured to modify some or all of the network traffic.

As shown in FIG. 1, the network diagnostic component 130 is preferably a SAS/SATA network diagnostic component. As used herein, "SAS/SATA network diagnostic components" includes network diagnostic components that are SAS compatible, network diagnostic components that are SATA compatible, and network diagnostic components that are both SAS compatible and SATA compatible. It will be appreciated, however, that the network diagnostic component 130 need not be a SAS/SATA network diagnostic component and that the network diagnostic component 130 may be another type of network diagnostic component that is compatible with other types of network protocols. In fact, the network diagnostic component 130 may be configured to perform its functions on any type of network and/or network topology using any number of network protocols.

Out of Band (OOB) Sequence and Speed Negotiation

Typically, nodes 110 and 120 undergo an initialization process prior to communicating with each other. This initialization process allows the two nodes to agree upon the protocol (e.g., speed and/or communication rules) that the nodes will utilize while communicating with each other.

As mentioned above, many nodes are configured to use both the SAS protocol and the SATA protocol. In such cases, it is often necessary during the initialization process for the nodes to specify whether they will be communicating using the SAS protocol or the SATA protocol.

Figure 4:
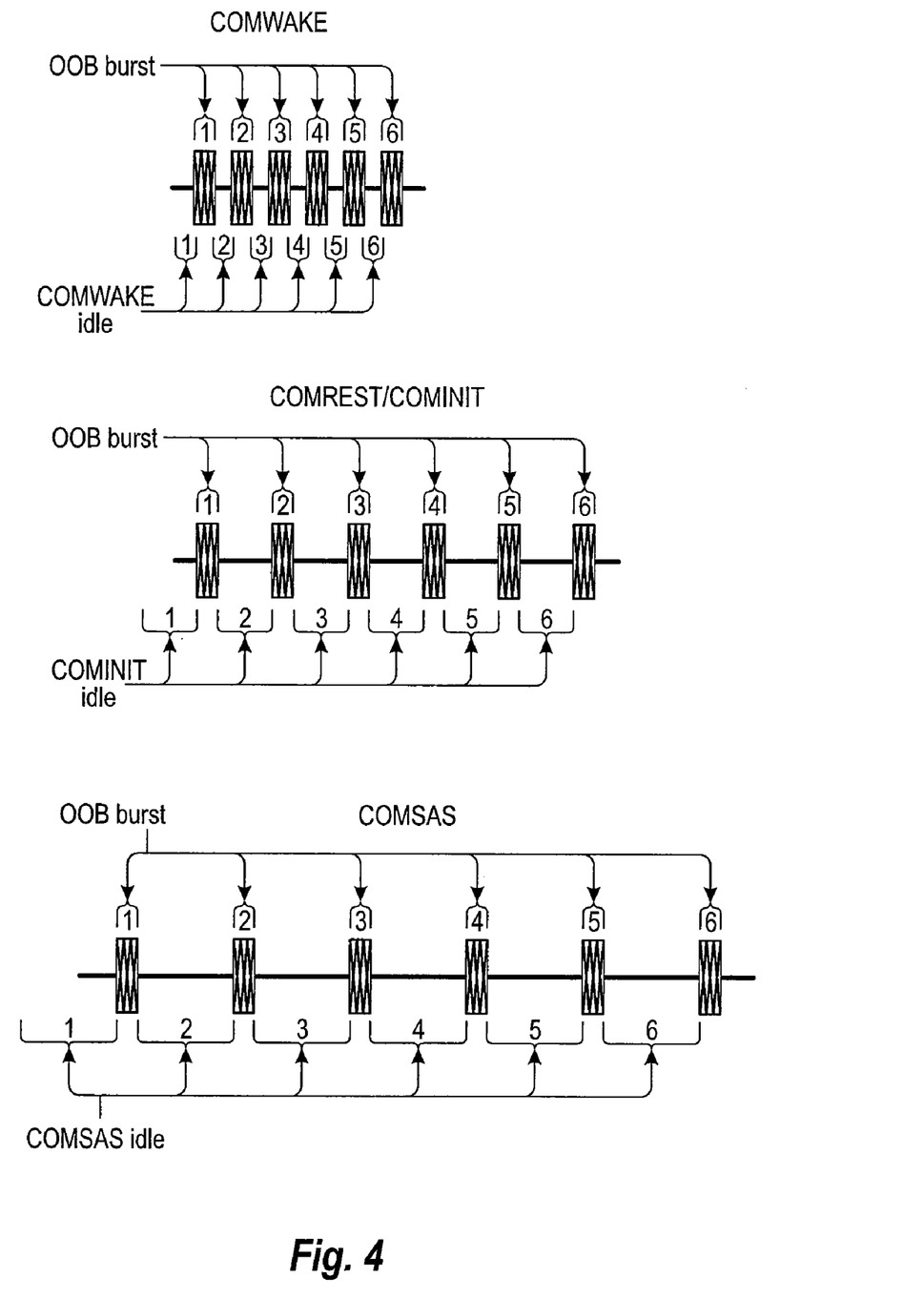
FIG. 4 illustrates data burst and D.C. idle portions of various SAS and SATA OOB signals.

The communication rules are specified as part of the initialization process by low speed Out of band (OOB) signals that are defined by the SAS and SATA protocols. OOB signals constitute defined periods of D.C. idle (common mode voltage) followed by defined periods of data bursts. These defined periods are specified by the SAS and SATA protocols. The data burst period is the same for all the OOB signals. The D.C. idle period, however, varies and is used to differentiate between the different kinds of OOB signals. For example, the data bursts and D.C. idles are defined in terms of an OOB Interval (OOBI), which at 1.5 Gigabits per second (Gbps) is nominally 666,666 picoseconds. The time periods for the data bursts and D.C. idles of various SAS and SATA OOB signals are summarized in Table 1. A graphical representation of the data burst and D.C, idle portions of the various SAS and SATA OOB signals is illustrated in FIG. 4.

TABLE 1

| Signal | Burst Time | DC-Idle Time |
| --- | --- | --- |
| COMWAKE | 160 OOBI | 160 OOBI |
| COMINIT/COMRESET | 160 OOBI | 480 OOBI |

TABLE 1-continued

| Signal | Burst Time | DC-Idle Time |
| --- | --- | --- |
| COMSAS | 160 OOBI | 1440 OOBI |

Node 110, when desiring to utilize the SAS protocol, may send OOB signals designated as COMINIT/COMRESET (COMINIT/COMRESET are electrically identical signals) and COMSAS to node 120. As shown in Table 1 and FIG. 4, these OOB signals have defined data burst periods and defined D.C. idle periods that indicate the signal type. Upon receipt of these OOB signals, node 120 will be informed that node 110 desires to communicate using the SAS protocol. The node 120 may then respond appropriately.

In similar manner, if node 110 wishes to utilize the SATA protocol, it may send the COMINIT/COMRESET OOB signal and a COMWAKE OOB signal to node 120. As with the other OOB signals previously discussed, the COMWAKE signal also has defined data burst periods and defined D.C. idle periods as also shown in Table 1 and FIG. 4. Upon receipt of these OOB signals, node 120 will be informed that node 110 desires to communicate using the SATA protocol. The node 120 may then respond appropriately.

In some cases, node 110 may not know ahead of time which protocol node 120 may support. In those instances, node 110 may send all of the OOB signals to node 120. Node 120 will then recognize the OOB signals for the protocol that it is configured at that particular time to support and will respond to node 110 appropriately.

The speed of communication, on the other hand, is determined during a speed negotiation sequence that typically follows the OOB sequence. This consists of different speed negotiation windows that often begin at the lowest possible speed and then continue to higher speeds. For example, SAS/SATA nodes typically communicate at 1.5 Gbps, 3 Gbps, 6 Gbps, etc.

For example, in the SAS protocol, node 110 would first send a speed negotiation signal at 1.5 Gbps to node 120. If node 120 recognized the 1.5 Gbps speed negotiation signal, then node 110 would send a speed negotiation signal at 3 Gbps. If node 120 recognized the 3 Gbps speed negotiation signal, then node 110 would send a speed negotiation signal at 6 Gbps. This process would continue until either node 110 reached its speed limit or there was a speed that node 120 did not recognize. In any case, the fastest speed supported by both nodes would be used.

In the SATA protocol, on the other hand, node 120, which is the SATA target in the illustrated embodiment, would send speed negotiation data at its highest speed first. If node 110 (the SATA host) could synchronize to this speed, then the speed is used. If node 110 could not synchronize, then node 120 would try its next highest speed until a speed is found that node 110 could synchronize to. For example, node 120 would first send a speed negotiation signal at 3 Gbps. If node 110 could not synchronize to this speed, node 120 would send a speed negotiation signal at 1.5 Gbps. This process would continue until there was a speed both nodes could support.

Forcing the Communication Rules

Figure 2:
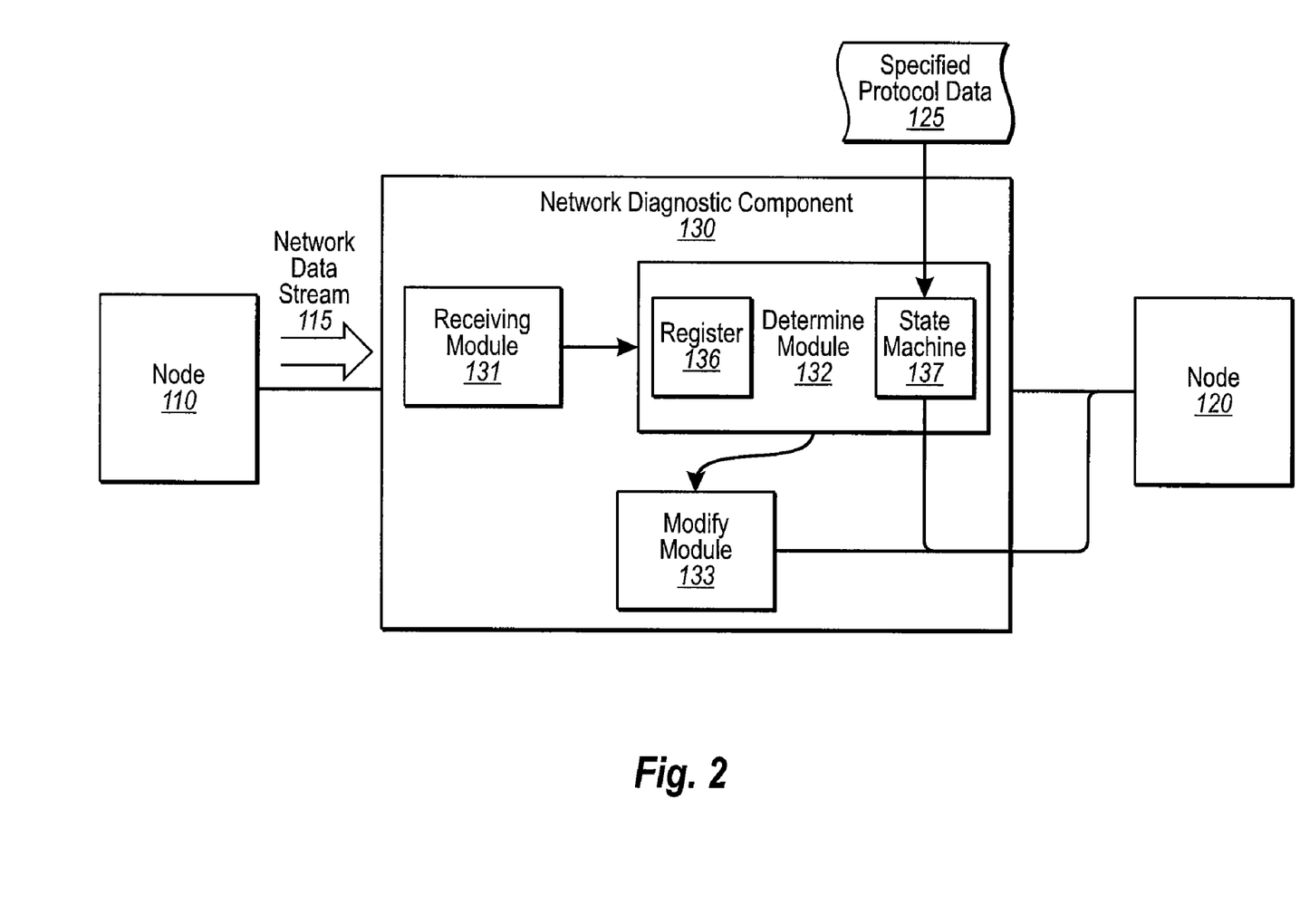
FIG. 2 illustrates a detailed view of a particular embodiment of the network of FIG. 1.

It is often the case, however, that a user of the networking system 100 desires to analyze the response of nodes 110, 120 to particular communication rules and/or speeds of the user's choice. Embodiments described herein allow for network diagnostic component 130 to control the protocol (both the communication rules and/or the speed of communication) at which nodes 110 and 120 communicate. Such embodiments will be described with reference to FIG. 1, which was previously described, and FIG. 2, which shows a detailed view of one particular embodiment of the networking system 100. Note that the embodiment of FIG. 2 is only one of numerous examples of the networking system 100 that can be used to implement the embodiments disclosed herein. Although the following embodiments will be described using the SAS and SATA protocols, this is by way of example only and should not be used to limit the scope of the appended claims. Other suitable protocols may also be utilized by the embodiments disclosed herein.

Referring to FIG. 2, node 110 may provide a network data stream 115 for communication with node 120 to network diagnostic component 130. As mentioned previously, data stream 115 may include many different kinds of information. In the present embodiment, data stream 115 may include portions that conform with at least a first network protocol. For example, network data stream 115 may include the OOB signals such as COMSAS that conform with the SAS protocol or network data stream 115 may include the OOB signals such as COMWAKE that conform with the SATA protocol. Alternatively, network data stream 115 may include OOB signals supported by both SAS and SATA protocols in cases where node 110 does not know the protocol node 120 will support.

Network data stream 115 may be received by a receive module or component 131 of network diagnostic component 130. Receive module 131 may be implemented in hardware, software, or any combination of the two. For example, receive module 131 may be a FIFO buffer configured to store the received network data stream 115.

The network data stream may then be provided to a determine module or component 132, which may also be implemented in hardware, software, or any combination of the two. In addition, determine module 132 may also receive specified protocol data 125 that indicates which type of OOB signals and speed negotiation data should not be passed by network diagnostic device 130. The specified protocol data 125 may be provided by a host computing system (not shown) that is connected in any reasonable way to network diagnostic component 130.

In one embodiment, determine module 132 may include a control register 136 and a control mechanism 137 such as a state machine. The control register 132 stores the specified protocol data 125 and provides this data to the control mechanism 137. The control mechanism 137 also receives the data stream 115 or may access the data stream 115 stored in receive module 131.

The control mechanism 137 determines, based on the desired protocol data 125, which OOB signals should not be passed. For example, suppose that the specified protocol data 125 indicated that SAS OOB signals (i.e., COMSAS) should not be passed or used to communicate with node 120. The control mechanism 137 would retrieve the specified protocol data 125 from the control register and would use this data to identify all COMSAS signals in data stream 115. The control mechanism 137 would then inform the modify module 133 that one or more COMSAS signals had been identified.

Modify module 133, which may be implemented in software, hardware, or any combination of the two such as, but not limited to, a state machine, may then be provided with the data stream 115 or it may access the data stream 115 in receive module 131. Modify module 133 is configured to modify the network data stream 115 such that the data stream 115 is no longer recognized as being in accordance with the protocol identified in specified protocol data 125. In this description and in the claims, "modify" is defined to include, but is not limited to, altering portions of a data stream or blocking portions of a data stream such that the portions do not pass to a second node.

For instance, continuing with the above example, modify module 133 may access all of the COMSAS OOB signals. The modify module 133 may then modify these signals by replacing all of the data burst portions of the signal with D.C. idles. As a consequence, the OOB signal would then look like a constant common mode voltage signal that did not conform to the SAS protocol.

On the other hand, modify module 133 would pass any SATA OOB signals (e.g., COMWAKE and COMINIT/COMRESET) that might be in data stream 115. Accordingly, the resulting signal that is received by node 120 will not be in accordance with the SAS protocol. In embodiments where data stream 115 included SATA OOB signals, data stream 115 would be in accordance with the SATA protocol. In embodiments where data stream 115 included only SAS OOB signals, then node 120 would only see the constant common mode voltage signal until such a time as node 110 sent a data stream including SATA OOB signals.

Although the above example described forcing the SATA protocol, the embodiments disclosed herein are also capable of forcing the SAS protocol. While forcing the SAS protocol, determine module 132 would receive specified protocol data 125 that indicated the SATA OOB signals should not be passed and would identify all SATA OOB signals (e.g., COMWAKE). The modify module 133 would then modify any SATA OOB signals by replacing all of the data burst portions of the signals with D.C. idles. In this way, node 120 would recognize that data stream 115 was no longer in accordance with the SATA protocol.

Forcing the Speed of Communication

In other embodiments, as previously mentioned, network diagnostic component 130 may be used to force the speed of communication between nodes 110 and 120. For example, suppose that both nodes 110 and 120 could support communication at 3 Gbps in the SAS protocol. Further suppose, however, that a user desired to force the nodes to communicate at 1.5 Gbps.

In this case, node 110 would provide a network data stream 115 that included speed negotiation data. Since node 110 was communicating in the SAS protocol, the speed negotiation data would indicate a speed of 1.5 Gbps, as this speed is typically the lowest speed for SAS protocol. The network data stream 115 would be a received by receive module 131 as described previously.

Determine module 132 would receive specified protocol data 125 that indicated that speed negotiation data of 3 Gbps should not be passed. Since the speed negotiation data in this instance was 1.5 Gbps, determine module 132 would determine that the speed negotiation data should be passed. This would be conveyed to modify module 133, which would consequently not modify the speed negotiation data. The data stream 115 with the speed negotiation data of 1.5 Gbps would then be provided to node 120, where it would be acknowledged.

As mentioned previously for SAS protocol, node 110 would then provide a data stream 115 that included speed negotiation data for 3 Gbps. The data stream would be received by receive module 131 and made available to determine module 132. In this case, determine module 132 would determine that the 3 Gbps speed negotiation data should not be passed. Determine module 132 would then identify the 3 Gbps speed negotiation data and inform modify module 133.

Modify module 133 may then modify the data stream 115 such that the second node 120 would no longer recognize the 3 Gbps speed negotiation data. In this case, the modify module may replace the 3 Gbps speed negotiation data with D.C. idles. As described above, the resulting signal would look like a constant common mode voltage signal that did not indicate any speed negotiation data. Node 120 would consequently fail to acknowledge the 3 Gbps speed.

As mentioned above, node 110 would then resend the 1.5 Gbps speed negotiation data. This would be passed by diagnostic component 130 and the two nodes would communicate at 1.5 Gbps. Accordingly, even though both nodes supported 3 Gbps, the speed is forced to be 1.5 Gbps.

Although the above example illustrated forcing the speed while communicating in the SAS protocol, the embodiments disclosed herein also allow for forcing the speed of communication in the SATA protocol. As mentioned above, while operating in SATA, the target node, which in the illustrated embodiment is node 120, sends its highest speed first. If node 110 cannot synchronize to the first speed in a given amount of time, then node 120 will send its next highest speed.

Suppose, as mentioned earlier, that both nodes 110 and 120 supported 3 Gbps but that a user desired to communicate at 1.5 Gbps. In this case, node 120 would send a data stream 115 that included speed negotiation data at 3 Gbps. This would be received by receive module 131 and accessed by determine module 132 as previously described. In addition, determine module 132 would receive specified protocol data 125 that indicated that speed negotiation data of 3 Gbps should not be passed. Determine module 132 would then identify the 3 Gbps speed negotiation data and inform modify module 133.

Modify module 133 may then modify the data stream 115 by blocking the 3 Gbps data from reaching node 110. As the 3 Gbps data is blocked, node 110 would be unable to synchronize with node 120 within a given amount of time specified by the SATA protocol.

Consequently, node 120 would then send speed negotiation data at 1.5 Gbps. This would be passed by diagnostic component 130 and the two nodes would communicate at 1.5 Gbps. Accordingly, even though both nodes supported 3 Gbps, the speed is forced to be 1.5 Gbps.

Figure 3:
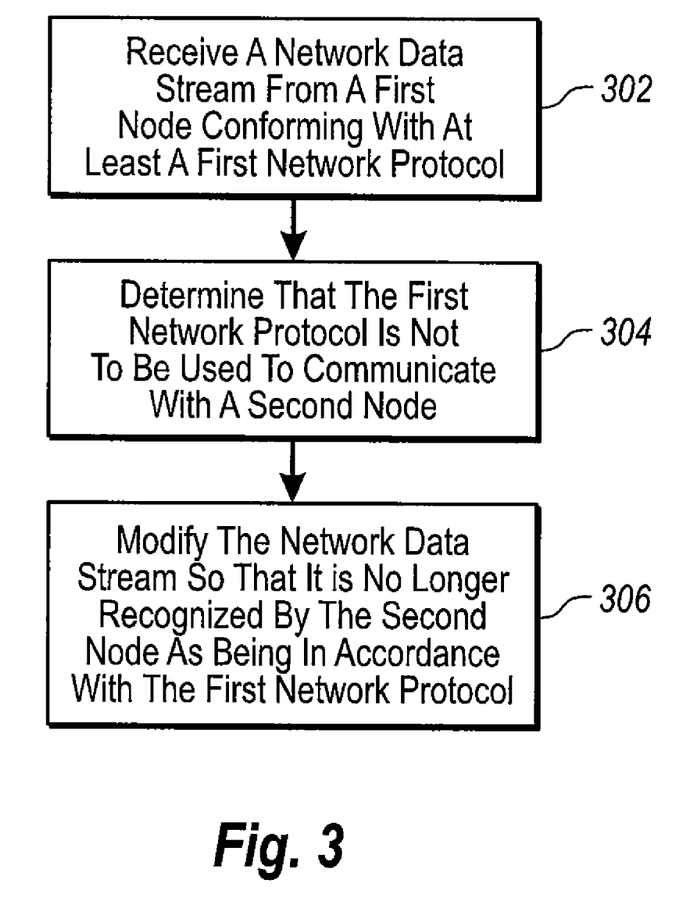
FIG. 3 illustrates a method for a network diagnostic component placed in-line between two nodes to control the protocol with which the two nodes communicate.

Referring now to FIG. 3, a flowchart of a method 300 for an in-line diagnostic component to control the protocol with which a first and a second node communicate is illustrated. Method 300 will be described in relation to the network system of FIGS. 1 and 2, although this is not required. It will be appreciated that method 300 may be practiced in numerous diagnostic network systems.

Method 300 includes an act of receiving a network data stream from a first node for communication with a second node, a portion of the network data stream conforming with at least a first network protocol (act 302). For example, network diagnostic component 130, specifically receive module 131, which may be a FIFO buffer, may receive network data stream 115 from node 110 or node 120. The network data stream 115 may conform to at least a first network protocol such as SAS and SATA. As mentioned above, protocol includes both speed of communication and communication rules. Note that the use of "first", "second", "third" and so on in the claims and in the description is not meant to imply any sequential ordering, but is used to distinguish one element from another.

In some embodiments, network data stream 115 may include communication rules for the SAS and/or SATA protocols, either separately or in combination. In addition, the network data may include a desired speed of communication for the SAS and/or SATA protocols, either separately or in combination. In some embodiments, only the communication rules are included in the network data stream, in other embodiments only the speed of communication is included in the network data stream, while in other embodiments, both are included in the network data stream.

Method 300 also includes an act of determining that the first network protocol is not to be used to communicate with the second node (act 304). For example, determine module 132 may determine in any of the ways previously described that a protocol included in the network data stream 115 should not be passed or used to communicate with the second node 120. For instance, determine module 132 may receive specific protocol data from a computing system that indicates which protocols should not be passed. In some embodiments, the determine module 132, which may include a control register and a control mechanism such as a state machine, determines that specific protocol OOB signals should not be passed. In other embodiments, the determine module 132 determines that speed negotiation data should not be passed.

Method 300 further includes an act of modifying the network data stream so that the network data stream is in a form that is no longer recognized by the second node as being in accordance with the first network protocol (act 306). For example, modify module 133 may modify an OOB signal in data stream 115 that is not to be passed by replacing all data bursts portions in the signal with a D.C. idle. In this way, the data stream no longer conforms to the protocol specified by the OOB signal.

In other embodiments, modify module 133 may modify speed negotiation data that is not to be passed by replacing the speed negotiation data with a D.C. idle. In still other embodiments, the modify module 133 blocks speed negotiation data from reaching the second node. In both of these embodiments, the data stream will no longer conform to the protocol specified by the speed negotiation data.

Example Network Diagnostic Functions

As mentioned above, the network diagnostic component 130 may perform a variety of network diagnostic functions. The network diagnostic component 130 may be configured to function as any combination of: a bit error rate tester, a protocol analyzer, a generator, a jammer, a monitor, and any other appropriate network diagnostic device.

Bit Error Rate Tester

In some embodiments, the network diagnostic component 130 may function as a bit error rate tester. The bit error rate tester may generate and/or transmit an initial version of a bit sequence via a communication path. If desired, the initial version of the bit sequence may be user selected. The bit error rate tester may also receive a received version of the bit sequence via a communication path.

The bit error rate tester compares the received version of the bit sequence (or at least a portion of the received version) with the initial version of the bit sequence (or at least a portion of the initial version). In performing this comparison, the bit error rate test may determine whether the received version of the bit sequence (or at least a portion of the received version) matches and/or does not match the initial version of the bit sequence (or at least a portion of the initial version). The bit error tester may thus determine any differences between the compared bit sequences and may generate statistics at least partially derived from those differences. Examples of such statistics may include, but are not limited to, the total number of errors (such as, bits that did not match or lost bits), a bit error rate, and the like.

It will be appreciated that a particular protocol specification may require a bit error rate to be less than a specific value. Thus, a manufacturer of physical communication components and connections (such as, optical cables), communication chips, and the like may use the bit error rate tester to determine whether their components comply with a protocol-specified bit error rate. Also, when communication components are deployed, the bit error tester may be used to identify defects in a deployed physical communication path, which then may be physically inspected.

Protocol Analyzer

In some embodiments, the network diagnostic component 130 may function as a protocol analyzer (or network analyzer), which may be used to capture data or a bit sequence for further analysis. The analysis of the captured data may, for example, diagnose data transmission faults, data transmission errors, performance errors (known generally as problem conditions), and/or other conditions.

As described below, the protocol analyzer may be configured to receive a bit sequence via one or more communication paths or channels. Typically, the bit sequence comprises one or more network messages, such as, packets, frames, or other protocol-adapted network messages. Preferably, the protocol analyzer may passively receive the network messages via passive network connections.

The protocol analyzer may be configured to compare the received bit sequence (or at least a portion thereof) with one or more bit sequences or patterns. Before performing this comparison, the protocol analyzer may optionally apply one or more bit masks to the received bit sequence. In performing this comparison, the protocol analyzer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence that comprises a network message having particular characteristics—such as, for example, having an unusual network address, having a code violation or character error, having an unusual timestamp, having an incorrect CRC value, indicating a link re-initialization, and/or having a variety of other characteristics.

The protocol analyzer may detect a network message having any specified characteristics, which specified characteristics may be user-selected via user input. It will be appreciated that a specified characteristic could be the presence of an attribute or the lack of an attribute. Also, it will be appreciated that the network analyzer may detect a network message having particular characteristics using any other suitable method.

In response to detecting a network message having a set of one or more characteristics, the network analyzer may execute a capture of a bit sequence—which bit sequence may comprise network messages and/or portions of network messages. For example, in one embodiment, when the network analyzer receives a new network message, the network analyzer may buffer, cache, or otherwise store a series of network messages in a circular buffer. Once the circular buffer is filled, the network analyzer may overwrite (or otherwise replace) the oldest network message in the buffer with the newly received network message or messages. When the network analyzer receives a new network message, the network analyzer may detect whether the network message has a set of one or more specified characteristics. In response to detecting that the received network message has the one or more specified characteristics, the network analyzer may execute a capture (1) by ceasing to overwrite the buffer (thus capturing one or more network messages prior to detected message), (2) by overwriting at least a portion or percentage of the buffer with one or more newly received messages (thus capturing at least one network message prior to the detected message and at least one network message after the detected message), or (3) by overwriting the entire buffer (thus capturing one or more network messages after the detected message). In one embodiment, a user may specify via user input a percentage of the buffer to store messages before the detected message, a percentage of the buffer to store messages after the detected message, or both. In one embodiment, a protocol analyzer may convert a captured bit stream into another format.

In response to detecting a network message having a set of one or more characteristics, a network analyzer may generate a trigger adapted to initiate a capture of a bit sequence. Also, in response to receiving a trigger adapted to initiate a capture of a bit sequence, a network analyzer may execute a capture of a bit sequence. For example, the network analyzer may be configured to send and/or receive a trigger signal among a plurality of network analyzers. In response to detecting that a received network message has the one or more specified characteristics, a network analyzer may execute a capture and/or send a trigger signal to one or more network analyzers that are configured to execute a capture in response to receiving such a trigger signal. Further embodiments illustrating trigger signals and other capture systems are described in U.S. patent application Ser. No. 10/881,620 filed Jun. 30, 2004 and entitled PROPAGATION OF SIGNALS BETWEEN DEVICES FOR TRIGGERING CAPTURE OF NETWORK DATA, which is hereby incorporated by reference herein in its entirety.

It will be appreciated that a capture may be triggered in response to detecting any particular circumstance—whether matching a bit sequence and bit pattern, receiving an external trigger signal, detecting a state (such as, when a protocol analyzer's buffer is filled), detecting an event, detecting a multi-network-message event, detecting the absence of an event, detecting user input, or any other suitable circumstance.

The protocol analyzer may optionally be configured to filter network messages (for example, network messages having or lacking particular characteristics), such as, messages from a particular node, messages to a particular node, messages between or among a plurality of particular nodes, network messages of a particular format or type, messages having a particular type of error, and the like. Accordingly, using one or more bit masks, bit patterns, and the like, the protocol analyzer may be used identify network messages having particular characteristics and determine whether to store or to discard those network messages based at least in part upon those particular characteristics.

The protocol analyzer may optionally be configured to capture a portion of a network message. For example, the protocol analyzer may be configured to store at least a portion of a header portion of a network message, but discard at least a portion of a data payload. Thus, the protocol analyzer may be configured to capture and to discard any suitable portions of a network message.

It will be appreciated that a particular protocol specification may require network messages to have particular characteristics. Thus, a manufacturer of network nodes and the like may use the protocol analyzer to determine whether their goods comply with a protocol. Also, when nodes are deployed, the protocol analyzer may be used to identify defects in a deployed node or in other portions of a deployed network.

Generator

In some embodiments, the network diagnostic component 130 may function as a generator. The generator may generate and/or transmit a bit sequence via one or more communication paths or channels. Typically, the bit sequence comprises network messages, such as, packets, frames, or other protocol-adapted network messages. The network messages may comprise simulated network traffic between nodes on a network. In one embodiment, the bit sequence may be a predefined sequence of messages. Advantageously, a network administrator may evaluate how the nodes (and/or other nodes on the network) respond to the simulated network traffic. Thus, the network administrator may be able to identify performance deviations and take appropriate measures to help avoid future performance deviations.

In one embodiment, the generator may execute a script to generate the simulated network traffic. The script may allow the generator to dynamically simulate network traffic by functioning as a state machine or in any other suitable manner. For example, a script might include one or more elements like the following: "In state X, if network message A is received, transmit network message B and move to state Y." The generator may advantageously recognize network messages (and any characteristics thereof) in any other suitable manner, including but not limited to how a protocol analyzer may recognize network messages (and any characteristics thereof). The script may also include a time delay instructing the generator to wait an indicated amount of time after receiving a message before transmitting a message in response. In response to receiving a message, a generator may transmit a response message that is completely predefined. However, in response to receiving a message, a generator may transmit a response message that is not completely predefined, for example, a response message that includes some data or other portion of the received message.

Jammer

In some embodiments, the network diagnostic component 130 may function as a jammer. The jammer may receive, generate, and/or transmit one or more bit sequences via one or more communication paths or channels. Typically, the bit sequences comprise network messages (such as, packets, frames, or other protocol-adapted network messages) comprising network traffic between nodes on a network. The jammer may be configured as an inline component of the network such that the jammer may receive and retransmit (or otherwise forward) network messages.

Prior to retransmitting the received network messages, the jammer may selectively alter at least a portion of the network traffic, which alterations may introduce protocol errors or other types of errors.

By altering at least a portion of the network traffic, the jammer may generate traffic, which traffic may be used to test a network. For example, a network administrator may then evaluate how the nodes on the network respond to these errors. For example, a network system designer can perform any one of a number of different diagnostic tests to make determinations such as whether a system responded appropriately to incomplete, misplaced, or missing tasks or sequences; how misdirected or confusing frames are treated; and/or how misplaced ordered sets are treated. In some embodiments, the network diagnostic component 130 may include any suitable jamming (or other network diagnostic system or method) disclosed in U.S. Pat. No. 6,268,808 B1 to Iryami et al., entitled HIGH SPEED DATA MODIFICATION SYSTEM AND METHOD, which is hereby incorporated by reference herein in its entirety.

In one embodiment, to determine which network messages to alter, the jammer may be configured to compare a received bit sequence—such as a network message—(or a portion of the received bit sequence) with one or more bit sequences or patterns. Before performing this comparison, the jammer may optionally apply one or more bit masks to the received bit sequence. In performing this comparison, the jammer may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a message to a particular node, a network message between or among a plurality of particular nodes, a network message of a particular format or type, and the like. Accordingly, the jammer may be configured to detect a network message having any specified characteristics. Upon detection of the network message having the specified characteristics, the jammer may alter the network message and/or one or more network messages following the network message.

Monitor

In some embodiments, the network diagnostic component 130 may function as a monitor, which may be used to derive statistics from one or more network messages having particular characteristics, one or more conversations having particular characteristics, and the like.

As described below, the monitor may be configured to receive a bit sequence via one or more communication paths or channels. Typically, the monitor passively receives the network messages via one or more passive network connections.

To determine the network messages and/or the conversations from which statistics should be derived, the monitor may be configured to compare a received bit sequence—such as a network message—(or a portion of the received bit sequence) with one or more bit sequences or patterns. Before performing this comparison, the monitor may optionally apply one or more bit masks to the received bit sequence. In performing this comparison, the monitor may determine whether all or a portion of the received bit sequence (or the bit-masked version of the received bit sequence) matches and/or does not match the one or more bit patterns. In one embodiment, the bit patterns and/or the bit masks may be configured such that the bit patterns will (or will not) match with a received bit sequence (or portion thereof) when the received bit sequence comprises a network message from a particular node, a network message to a particular node, a network message between or among a plurality of particular nodes, a network message of a particular format or type, a network message having a particular error, and the like. Accordingly, the monitor may be configured to detect a network message having any specified characteristics—including but not limited to whether the network message is associated with a particular conversation among nodes.

Upon detecting a network message having specified characteristics, the monitor may create and update table entries to maintain statistics for individual network messages and/or for conversations comprising packets between nodes. For example, a monitor may count the number of physical errors (such as, bit transmission errors, CRC errors, and the like), protocol errors (such as, timeouts, missing network messages, retries, out of orders), other error conditions, protocol events (such as, an abort, a buffer-is-full message), and the like. Also, as an example, the monitor may create conversation-specific statistics, such as, the number of packets exchanged in a conversation, the response times associated with the packets exchanged in a conversation, transaction latency, block transfer size, transfer completion status, aggregate throughput, and the like. It will be appreciated that a specified characteristic could be the presence of an attribute or the lack of an attribute.

In some embodiments, the network diagnostic component 130 may include any features and/or perform any method described in U.S. patent application Ser. No. 10/769,202, entitled MULTI-PURPOSE NETWORK DIAGNOSTIC MODULES and filed on Jan. 30, 2004, which is hereby incorporated by reference herein in its entirety.

Example Systems

It will be appreciated that the network diagnostic component 130 may be used to implement a variety of systems.

In one embodiment, the network diagnostic component 130 may comprise a printed circuit board. The printed circuit board may include a CPU module.

In one embodiment, the network diagnostic component 130 may comprise a blade. The blade may include a printed circuit board, an interface, or any combination thereof.

In one embodiment, the network diagnostic component 130 may comprise a chassis computing system. The chassis computing system may include one or more CPU modules, which may be adapted to interface with one, two, or more blades or other printed circuit boards. For example, a blade may have an interface though which a diagnostic module may send network diagnostic data to a CPU module of the chassis computing system. The chassis computer system may be adapted to receive one or more printed circuit boards or blades.

A CPU module may transmit the network diagnostic data it receives to a local storage device, a remote storage device, or any other suitable system for retrieval and/or further analysis of the diagnostic data. A client software program may retrieve, access, and/or manipulate the diagnostic data for any suitable purpose. Examples of systems and methods for storing and retrieving network diagnostic data include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

In one embodiment, the network diagnostic component 130 may comprise an appliance. Depending on the particular configuration, the appliance may include any suitable combination of one or more CPU modules and one or more diagnostic modules. In one embodiment, an appliance may include and/or be in communication with one or more storage devices, which may advantageously be used for storing any suitable diagnostic data, statistics, and the like. In one embodiment, an appliance may include and/or be in communication with one or more client interface modules, which may advantageously be used for displaying information to a user, receiving user input from a client software program, or sending information to a client software program. The appliance may also include and/or be in communication with one or more display devices (such as, a monitor) adapted to display information, one or more user input devices (such as, a keyboard, a mouse, a touch screen, and the like) adapted to receive user input, or both.

It will be appreciated that the network diagnostic component 130 may comprise any of a variety of other suitable network diagnostic components.

Example Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a communication network including a link between first and second nodes communicating with each other using a network protocol selectable by the first and the second nodes by sending a network data stream from the first node to the second using a first network protocol and determining if the network data stream has been recognized by the second node, a method for controlling selection of the network protocol, the method comprising:
   (a) placing a network diagnostic component in-line between the first and the second nodes, wherein the network data stream is available to the network diagnostic component;
   (b) initiating sending of the network data stream from the first to the second node using the first network protocol;
   (c) using the network diagnostic component to modify the network data stream of step (b), so as to make the network data stream not recognizable by the second node, thereby forcing the first node to initiate sending of the network data stream from the first to the second node using a second network protocol, and
   wherein in step (c), the modification of the network data stream includes changing at least a portion of the network data stream into a D.C. idle portion by blocking the portion of the network data stream, such that the blocked portion is not passed to the second node.

2. The method in accordance with claim 1, wherein step (c) comprises:
   (c1) receiving data that indicates that the portion of the network data stream should not be passed; and
   (c2) identifying the portion of the network data stream based on the data received in step (c1).

3. The method in accordance with claim 1, wherein the first network protocol includes speed negotiation rules.

4. The method in accordance with claim 1, wherein the first network protocol is one of the SAS protocol or the SATA protocol.

5. The method in accordance with claim 1, wherein the network data stream comprises one or more data bursts of a defined period and one or more DC-idle periods whose lengths identify the type of the one or more data bursts.

6. The method in accordance with claim 5, wherein the one or more data bursts are of the SAS protocol or the SATA protocol.

7. A network diagnostic device for placing in-line between first and second nodes in a communication network, the first and the second nodes communicating with each other using a network protocol selectable by the first and the second nodes by sending a network data stream from the first node to the second using a first network protocol and determining if the network data stream has been recognized by the second node, the network diagnostic device comprising:
   a first component configured to receive the network data stream from the first node for communication with the second node, a portion of the network data stream conforming with at least a first network protocol;
   a second component configured to determine that the first network protocol is not to be used to communicate with the second node;
   a third component configured to change the network data stream portion into a D.C. idle portion, so as to make the network data stream not recognizable by the second node, thereby forcing the first node to initiate sending of the network data stream from the first to the second node using a second network protocol, and
   wherein the third component is configured to perform the change of the network data stream portion into the D.C. idle portion by blocking the data stream portion, such that the blocked portion is not passed to the second node.

8. The network diagnostic device in accordance with claim 7, wherein the first component is a FIFO buffer configured to receive and store the network data stream.

9. The network diagnostic device in accordance with claim 7, wherein the first and second nodes are SAS/SATA nodes.

10. The network diagnostic device in accordance with claim 7, wherein the network diagnostic device is a SAS/SATA network component.

11. The network diagnostic device in accordance with claim 7, wherein the first network protocol is one of SAS protocol or SATA protocol.

12. The network diagnostic device in accordance with claim 7, wherein the network diagnostic device is one of a bit error rate tester, a protocol analyzer, a bit sequence generator, a jammer, and a monitor.

13. A diagnostic network comprising:
   a first node;
   a second node;
   a network diagnostic component placed in-line between the first and second nodes, the network diagnostic component comprising:
   a receive module configured to receive a network data stream from the first node for communication with the second node, a portion of the network data stream conforming with at least a first network protocol;
   a determine module configured to determine that the first network protocol is not to be used to communicate with the second node;
   a modify module configured to change one or more data stream portions of the network data stream conforming with the first network protocol into D.C. idle portions, so as to make the network data stream not recognizable by the second node, thereby forcing the first node to initiate sending of the network data stream from the first to the second node using a second network protocol, and
   wherein the modify module is configured to perform the chance of the one or more data stream portions into the D.C. idle portions by blocking the one or more data stream portions, such that the blocked one or more data stream portions are not passed to the second node.

14. The diagnostic network in accordance with claim 13, wherein the first network protocol is one of the SAS protocol or the SATA protocol.

15. The diagnostic network in accordance with claim 13, wherein the network data stream comprises one or more SAS or SATA data bursts of a defined period and one or more DC-idle periods whose length identify the type of the one or more data bursts as being of the SAS or SATA protocol.

16. The diagnostic network in accordance with claim 13, wherein the first and second nodes are SAS/SATA nodes and the network diagnostic device is a SAS/SATA network component.

* * * * *

UNITED STATES PATENT AND TRADEMARK OFFICE
CERTIFICATE OF CORRECTION

PATENT NO. : 8,339,955 B2
APPLICATION NO. : 11/675038
DATED : December 25, 2012
INVENTOR(S) : Vedanabhatla et al.

It is certified that error appears in the above-identified patent and that said Letters Patent is hereby corrected as shown below:

In the Claims

Col. 18, claim 13, line 50, "chance" should read -- change --

Signed and Sealed this
Thirtieth Day of July, 2013

Teresa Stanek Rea
*Acting Director of the United States Patent and Trademark Office*